United States Patent [19]

Yanai et al.

[11] Patent Number: 5,781,181
[45] Date of Patent: Jul. 14, 1998

[54] APPARATUS AND METHOD FOR CHANGING AN OPERATION MODE OF A COORDINATE INPUT APPARATUS

[75] Inventors: Akira Yanai; Osamu Hara; Tsuyoshi Ogura, all of Fukushima-ken, Japan

[73] Assignee: Alps Electric Co., Ltd., Tokyo, Japan

[21] Appl. No.: 682,057

[22] Filed: Jul. 16, 1996

[30] Foreign Application Priority Data

Jul. 25, 1995 [JP] Japan ................. 7-189368

[51] Int. Cl.$^6$ ............................. G08C 21/00
[52] U.S. Cl. ............................. 345/173; 345/157
[58] Field of Search ................. 345/156, 174, 345/173, 179, 158, 175; 395/358

[56] References Cited

U.S. PATENT DOCUMENTS

| | | | |
|---|---|---|---|
| 4,680,430 | 7/1987 | Yoshikawa et al. | 345/174 |
| 4,698,460 | 10/1987 | Krein et al. | 345/173 |
| 5,220,649 | 6/1993 | Forcier | 395/358 |
| 5,327,161 | 7/1994 | Logan et al. | 345/173 |
| 5,347,295 | 9/1994 | Agulnick et al. | 395/358 |
| 5,402,151 | 3/1995 | Duwaer | 345/174 |
| 5,539,427 | 7/1996 | Bricklin et al. | 345/173 |
| 5,543,590 | 8/1996 | Gillespie et al. | 345/174 |
| 5,592,607 | 1/1997 | Weber et al. | 395/358 |
| 5,615,384 | 3/1997 | Allard et al. | 345/173 |

*Primary Examiner*—Raymond J. Bayerl
*Assistant Examiner*—John Suraci
*Attorney, Agent, or Firm*—Guy W. Shoup

[57] ABSTRACT

A coordinate detection system capable of displaying relevant coordinates when operated with only one fingertip or like coordinate designator even during a repeat operation of the latter with no complicated designator manipulations required. The system comprises a coordinate detection apparatus and a coordinate output apparatus. The coordinate detection apparatus includes a sensor substrate to be operated by the coordinate designator, scan driving output units for generating a detection signal in response to the coordinate designator operation, and signal processing units for extracting tap and slide component data from the detection signal and supplying the extracted data to the coordinate output apparatus. The coordinate output apparatus includes a state detecting unit for detecting the state of the tap and slide component data, a measuring unit for measuring the tap component data, a mode changing unit for changing operation modes depending on the result of the measurement, a control unit for controlling the apparatus and a display unit for displaying various kinds of data. Operation modes are changed only if the tap component data is supplied in a predetermined state.

5 Claims, 4 Drawing Sheets

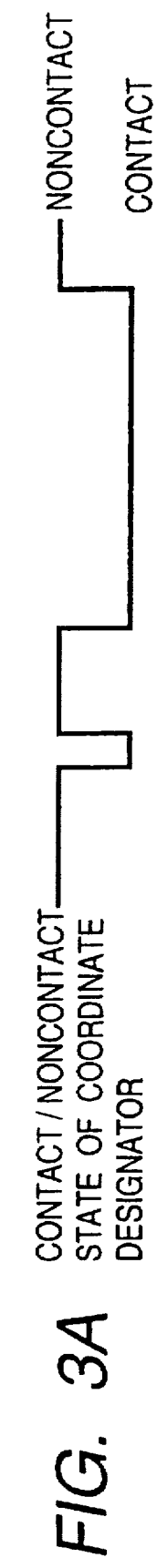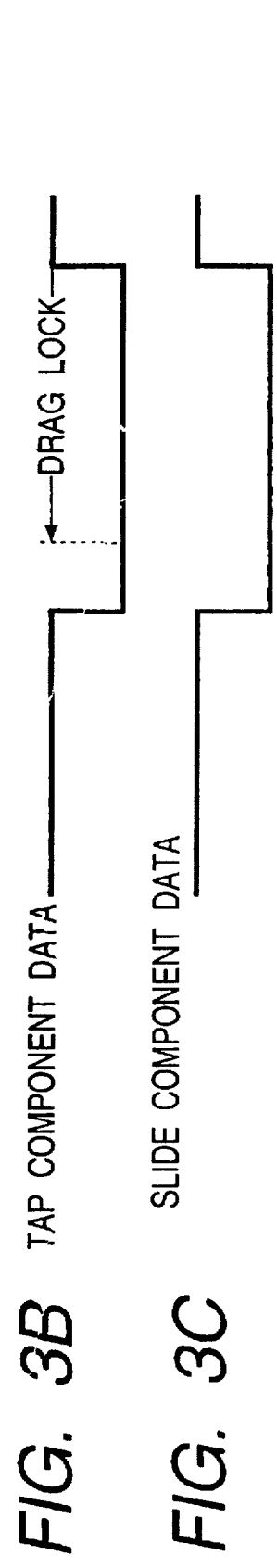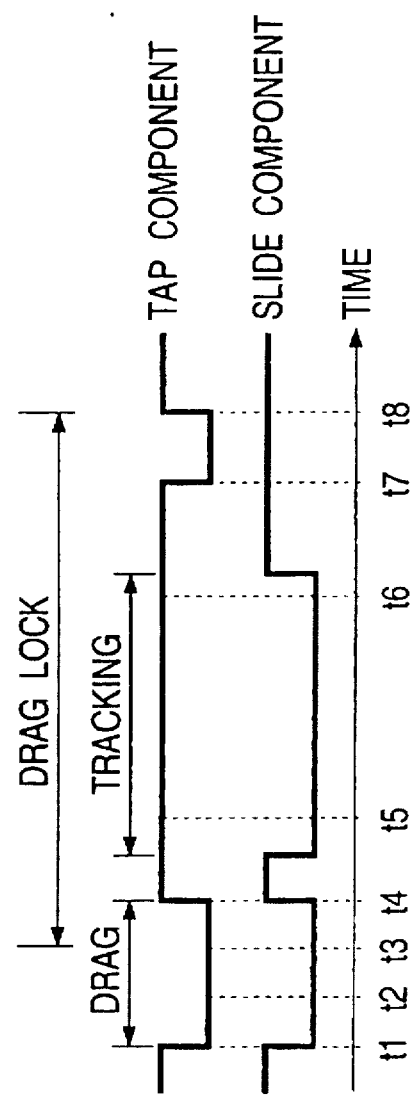
FIG. 3A
FIG. 3B
FIG. 3C
FIG. 5

APPARATUS AND METHOD FOR CHANGING AN OPERATION MODE OF A COORDINATE INPUT APPARATUS

BACKGROUND OF THE INVENTION

The present invention relates to a coordinate detection system comprising a coordinate detection apparatus and a coordinate output apparatus. More particularly, the invention relates to a coordinate detection system including a coordinate detection apparatus having a sensor substrate operated by a coordinate designator such as a fingertip, and a coordinate output apparatus for displaying appropriate coordinate positions based on the tap and slide component data output by the coordinate detection apparatus, whereby necessary coordinate display procedures are performed by a minimum of operations by the coordinate designator.

Known coordinate detection systems typically comprise a coordinate detection apparatus and a coordinate output apparatus. The coordinate detection apparatus has a sensor substrate operated by a coordinate designator such as a fingertip and a signal processing unit for converting to the digital format a serial detection signal derived from the sensor substrate operation and for extracting switch data and slide component data from the digital signal. The coordinate output apparatus includes a data analyzing unit for analyzing the contents of the switch data and slide component data supplied from the coordinate detection apparatus, a control unit for controlling the apparatus operation as a whole, and a display unit for displaying various kinds of data.

In the above type of coordinate detection system, an operation by the coordinate designator of the sensor substrate in the coordinate detection apparatus causes the sensor substrate to output a serial detection signal reflecting the operation state of the coordinate designator. The operation state of the coordinate designator at this point is identified by two kinds of data: switch data indicating that a switch located close to the sensor substrate is pushed by a fingertip, and slide component data indicating that another fingertip also acting as the coordinate designator is sliding over the sensor substrate while in contact with the latter. The switch data and slide component data include address elements that reveal at which point on the sensor substrate a switch-on operation is effected with the push of a fingertip, or from which point to which point the fingertip has slid over the sensor substrate.

The data analyzing unit in the coordinate output apparatus analyzes the contents of the switch data and slide component data fed from the coordinate detection apparatus. The result of the analysis is supplied to the display unit. In turn, the display unit displays an image indicative of the operation that the coordinate designator has performed on the sensor substrate. With the coordinate designator pushed down into the switchedon state, sliding the coordinate designator from one point to another on the sensor substrate causes a cursor to move from one position to another on the screen and to form a line along its locus. With the coordinate designator in the switched-off state, sliding the coordinate designator from one point to another on the sensor substrate causes the cursor simply to move from one position to another on the screen. The state of the image appearing on the display unit when the coordinate designator is slid in the switched-on state is usually called a drag state. The state of the displayed image during simple cursor movement, i.e., when the coordinate designator is slid in the switched-off state, is called a normal state.

With the above type of coordinate detection system fabricated in small dimensions, the effective area over the sensor substrate differs in size from the effective area on the screen of the display unit. This often means that the range of operations by the coordinate designator on the sensor substrate is different from the range of cursor movements on the display screen. For example, suppose that the coordinate designator is moved in the drag state from one corner region to the diagonally opposite corner region of the sensor substrate in order to move the cursor, correspondingly, from one corner region to the diagonally opposite corner region on the display screen and thereby to draw a line along the cursor locus. In such a case, the operation of the coordinate designator typically causes the cursor movement on the screen and its locus to reach merely a halfway, center region of the screen. To extend the cursor movement and its locus from that midway region to the target corner region of the screen requires a repeat operation of the coordinate designator: lifting the coordinate designator from the diagonally opposite corner region of the sensor substrate, returning it to the initial corner region, and again sliding the coordinate designator in the drag state from that corner region to the diagonally opposite corner region of the sensor substrate. If an operation of the coordinate designator is started in the drag state, the repeat operation of the coordinate designator also requires moving it in the same drag state.

As outlined, it is necessary for the above conventional coordinate detection system to be switched on and off with both hands in order to get a desired screen state. In particular, where the coordinate designator is initially operated in the drag state, a repeat operation of the coordinate designator needs to be performed in the same drag state as well. This requires careful and complicated maneuvering of the coordinate designator and thus entails reduced levels of designator operability.

SUMMARY OF THE INVENTION

It is therefore an object of the present invention to overcome the above and other deficiencies of the prior art and to provide a coordinate detection system capable of displaying appropriate coordinate positions through the use of only one finger or the like even during the so-called repeat operation of the coordinate designator, whereby the need for complicated maneuvering of the coordinate designator is eliminated.

In carrying out the invention and according to one aspect thereof, there is provided a coordinate detection system comprising a coordinate detection apparatus and a coordinate output apparatus. The coordinate detection apparatus comprises a sensor substrate operated by a coordinate designator, a detection signal generating unit for generating a detection signal corresponding to the operation of the coordinate designator within the sensor substrate, and a signal processing unit for digitally extracting tap component data and slide component data from inside the detection signal and for supplying the extracted data to the coordinate output apparatus. The coordinate output apparatus comprises a data analyzing unit for analyzing the contents of the tap component data and the slide component data, a measuring unit for measuring the tap component data, a mode changing unit for changing operation modes in accordance with the result of the measurement by the measuring unit, a control unit for controlling the coordinate output apparatus as a whole, and a display unit for displaying various kinds of data. The mode changing unit changes operation modes only if the tap component data is supplied in a predetermined state.

In the coordinate detection system of the above constitution, the coordinate output apparatus includes the measuring unit and mode changing unit. The measuring unit measures the continuous state of the tap component data fed to the coordinate output apparatus. If the result of the measurement shows that the tap component data has continued for a period shorter than a predetermined period of time, the mode changing unit does not change the current operation mode of the coordinate output apparatus. In that case, the coordinate output apparatus acts only in response to a switch-on/off operation. If the tap component data is found to have continued for a period at least as long as the predetermined period of time, the mode changing unit causes the coordinate output apparatus to remain in drag mode. If the operation of the coordinate designator has been started in the drag state, and if either the number of slide components is counted at least up to a predetermined count value, or slide component data is measured to have continued for at least as long as the predetermined period of time, then the coordinate output apparatus is placed in drag lock mode. Thereafter, the coordinate designator is operated in drag mode whether or not the coordinate designator is in contact with the sensor substrate.

As outlined, the above coordinate detection system allows the coordinate designator to be simply operated especially during its repeat operation. The result is an enhanced level of coordinate designator maneuverability.

These and other objects, features and advantages of the invention will become more apparent upon a reading of the following description and appended drawings.

BRIEF DESCRIPTION OF THE DRAWINGS

FIGS. 3A, 3B and 3C are data transition charts showing how the coordinate output apparatus is illustratively set in and out of drag lock mode;

FIG. 5 is a data transition chart depicting how tap component data and slide component data illustratively change over time.

DESCRIPTION OF THE PREFERRED EMBODIMENT

Figure 1:
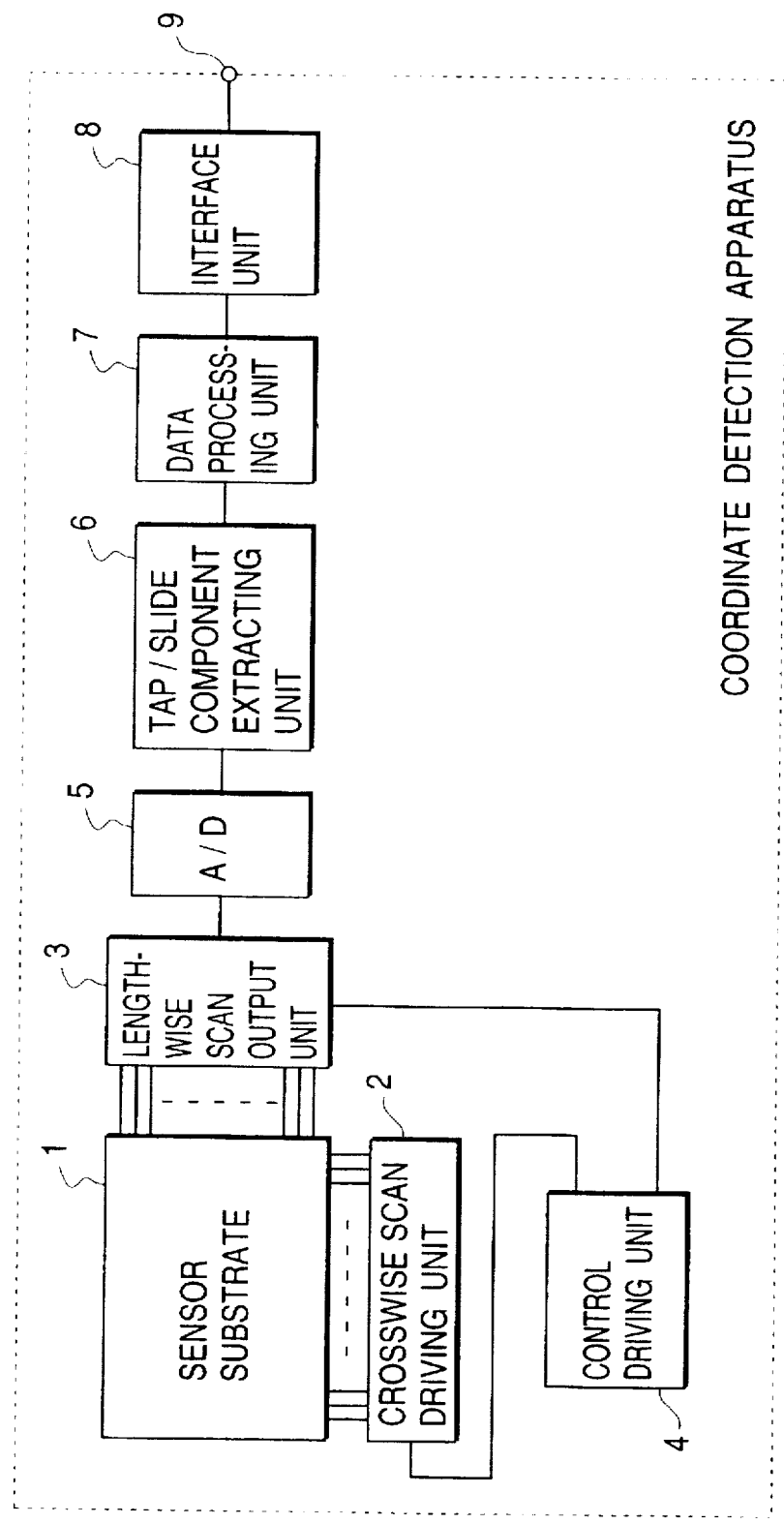
FIG. 1 is a block diagram of a coordinate detection system which embodies the invention and which highlights the major components of a coordinate detection apparatus included therein.
Figure 2:
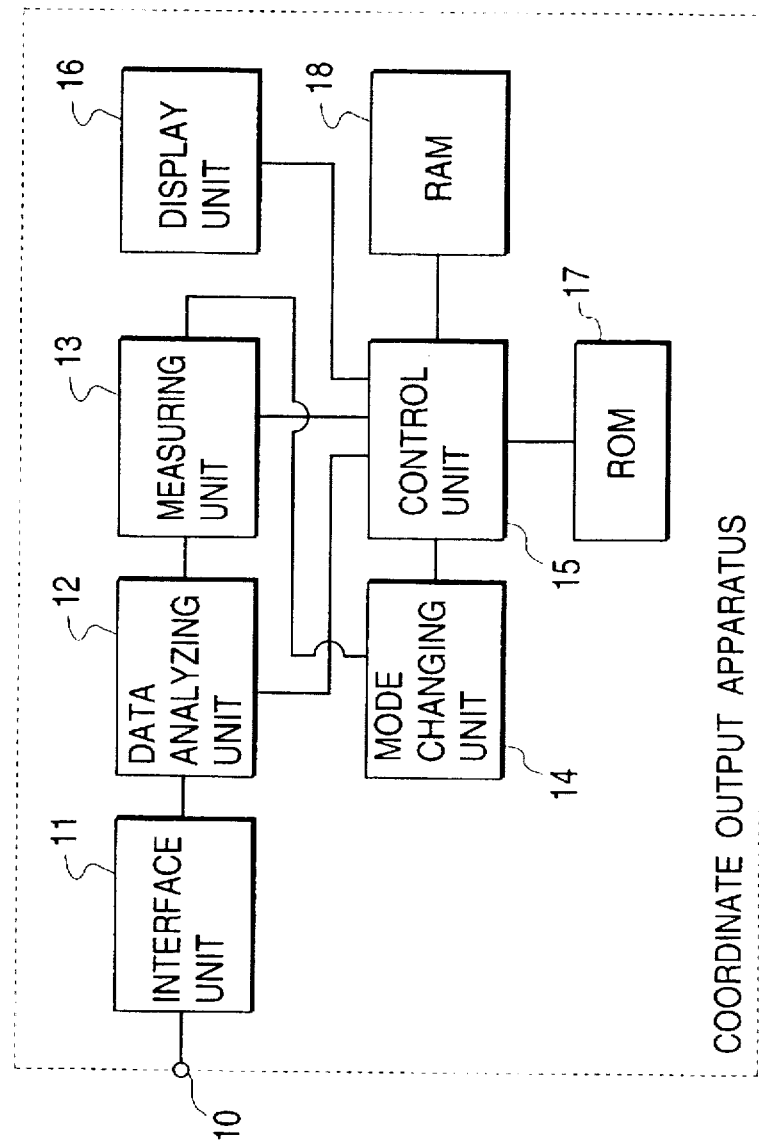
FIG. 2 is a block diagram of the inventive coordinate detection system highlighting the major components of a coordinate output apparatus included therein.

A preferred embodiment of the invention will now be described with reference to the accompanying drawings. FIGS. 1 and 2 are block diagrams of a coordinate detection system practiced as the preferred embodiment of the invention. FIGS. 1 and 2 highlight respectively the major components of a coordinate detection apparatus and those of a coordinate output apparatus both included in the embodiment.

In FIG. 1, reference numeral 1 is a sensor substrate; 2 is a crosswise (X axis) scan driving unit; 3 is a lengthwise (Y axis) scan output unit; 4 is a control driving unit; 5 is an analog-digital converter; 6 is a tap/slide component extracting unit; 7 is a data processing unit; 8 is an interface unit; and 9 is an output port.

The sensor output 1 has a rectangular operating area that may be operated by a coordinate designator (not shown) such as a fingertip. Any coordinate position within the operating area is designated as a point of intersection between one of a large number of crosswise (X axis) scanning lines and one of numerous lengthwise (Y axis) scanning lines. The crosswise scan driving unit 2, scanning the sensor substrate 1 crosswise, has a single driving input connected to the control driving unit 4 and a large number of signal outputs connected to the crosswise scanning lines. The lengthwise scan output unit 3 scans the sensor substrate 1 in the lengthwise direction to generate a serial detection signal. The lengthwise scan output unit 3 has a single driving input connected to the control driving unit 4, a large number of signal inputs connected to the lengthwise scanning lines, and a single signal output to the input of the analog-digital converter 5. The control driving unit 4 drives the crosswise scan driving unit 2 and lengthwise scan output unit 3 by supplying them with scan driving signals. The analog-digital converter 5 for converting the serial detection signal to a digital signal has its output connected to the input of the tap/slide component extracting unit 6. The tap/slide component extracting unit 6 extracts tap and slide components from within the digital signal derived from the serial detection signal. The output of the tap/slide component extracting unit 6 is connected to the signal input of the data processing unit 7. The data processing unit 7 processes the tap component data and slide component data separately. The output of the data processing unit 7 is connected to the input of the interface unit 8. The interface unit 8 for interfacing to an externally connected coordinate output apparatus has its output connected to the output port 9.

In FIG. 2, reference numeral 10 is an input port; 11 is an interface unit; 12 is a data analyzing unit; 13 is a measuring unit; 14 is a mode changing unit; 15 is a control unit; 16 is a display unit; 17 is a read-only memory (ROM); and 18 is a random access memory (RAM).

The interface unit 11 is designed to interface with the externally connected coordinate detection apparatus. The input of the interface unit 11 is connected to the input port 10 and its output is connected to the input of the data analyzing unit 12. The data analyzing unit 12 analyzes the contents of the tap component data and slide component data that have been input. The output of the data analyzing unit 12 is connected to the input of the measuring unit 13. The measuring unit 13 measures the continuous state of the tap component data. The output of the measuring unit 13 is connected to the control unit 15. The mode changing unit 14 changes the operation mode of the coordinate output apparatus to drag mode or to drag lock mode. The input and output of the mode changing unit 14 are connected to the control unit 15. The control unit 15, which controls the coordinate output apparatus as a whole, is connected to the components 12 through 14 and 16 through 18 except the interface unit 11. The display unit 16 for screen display has its input connected to the control unit 15. The ROM 17 stores the operation program for the control unit 15 and is connected to the control unit 15. The RAM 18, intended to retain temporarily the data processed by the control unit 15, is connected to the latter.

The coordinate detection system constituted as described above operates principally as follows:

In the coordinate detection apparatus, driving signals output by the control driving unit 4 drive the crosswise scan driving unit 2 and lengthwise scan output unit 3 in their respective scanning operations. This causes each of the scanning lines of the sensor substrate 1 to be supplied with scanning signals. In that state, the coordinate designator such as a fingertip operates on a given position or positions of the sensor substrate 1. In response, the lengthwise scan output unit 3 outputs a serial detection signal reflecting the operation state. The serial detection signal is sent to the analog-digital converter 5. In such a case, the serial detection signal contains two kinds of data: tap components generated by the coordinate designator having pushed the sensor substrate 1, and slide components generated by the coordinate designator having slid over the sensor substrate 1. In addition, the tap components include address elements indicating the point at which the coordinate designator has pushed the sensor substrate 1, and the slide components comprise address elements indicating the locus along which the coordinate designator has slid over the sensor substrate 1.

The serial detection signal is converted to the digital format by the analog-digital converter 5. The digital signal from the converter is fed to the tap/slide component extracting unit 6 which separates the received signal into tap component data and slide component data. The tap component data is sent to the data processing unit 7 whereby the tap data alone is extracted. From the data processing unit 7, the tap data is forwarded to the output port 9 via the interface unit 8. The slide component data, also sent to the data processing unit 7, is subjected therein to noise reduction before being fed to the output port 9 also by way of the interface unit 8.

In the coordinate output apparatus, the tap component data and slide component data having reached the input port 10 are sent to the data processing unit 12 via the interface unit 11. The data processing unit 12 analyzes the contents of the received tap component data and slide component data in order to verify the start and end points of these data, the continuous state of the data, and the address elements. Thereafter, the tap component data and slide component data are supplied to the control unit 15 via the measuring unit 13. The control unit 15 transforms the received tap component data and slide component data into a data format suitable for screen display, and sends the transformed data to the display unit 16. The display unit 16 then gives an image indicative of the operation state of the coordinate designator being maneuvered on the sensor substrate 1. In such a case, the control unit 15 executes control operations in accordance with the operation program stored in the ROM 17. The data obtained from such control operations is held temporarily in the RAM 18.

Meanwhile, the measuring unit 13 initiates a counting operation upon detecting tap-on information in the tap component data while the latter data is being supplied continuously. The measuring unit 13 stops the counting operation upon detecting tap-off information in the tap component data. When the count value from the counting operation reaches a predetermined value, the measuring unit 13 supplies a control signal to the mode changing unit 14. Upon receipt of the control signal, the mode changing unit 14 sends a mode change signal to the control unit 15. This causes the coordinate output apparatus to be changed from the current drag mode to drag lock mode. Drag lock mode is retained thereafter until another tap-on information is detected, followed by tap-off information again in the tap component data.

FIGS. 3A, 3B and 3C are data transition charts showing how the coordinate output apparatus is illustratively set in and out of drag lock mode. Specifically, FIG. 3A illustrates a contact and a noncontact state of the coordinate designator such as a fingertip with respect to the sensor substrate 1. FIG. 3B indicates a typical state of the tap component data, and FIG. 3C denotes a typical state of the slide component data.

Suppose that as shown in FIG. 3A, the coordinate designator such as the fingertip performs a so-called one-and-a-half tap operation on the sensor substrate 1, i.e., the fingertip is brought into contact with the sensor substrate 1 for a short period of time, is lifted therefrom, and is again made to touch the substrate for a prolonged contact. In that case, the coordinate output apparatus is set in drag mode. With the coordinate output apparatus in drag mode, keeping the coordinate designator (e.g., fingertip) in contact with the sensor substrate 1 starts supplying the coordinate output apparatus with tap component data the moment the fingertip touches the sensor substrate 1 a second time, as illustrated in FIG. 3B. If the coordinate designator is slid over the sensor substrate 1 while in contact therewith, both the tap component data and the slide component data start to be fed the moment the coordinate designator is placed on the sensor substrate 1 a second time, as depicted in FIG. 3C. In such a case, the measuring unit 13 measures the period during which the coordinate designator (fingertip) is in contact with or is sliding over the sensor substrate 1, i.e., the continuous state of the tap component data or the slide component data. When the tap component data or slide component data is measured to have lasted longer than a predetermined period of time, the measuring unit 13 causes the control unit 15 to send a mode change signal to the mode changing unit 14, whereby the coordinate output apparatus is switched into drag lock mode.

Figure 4:
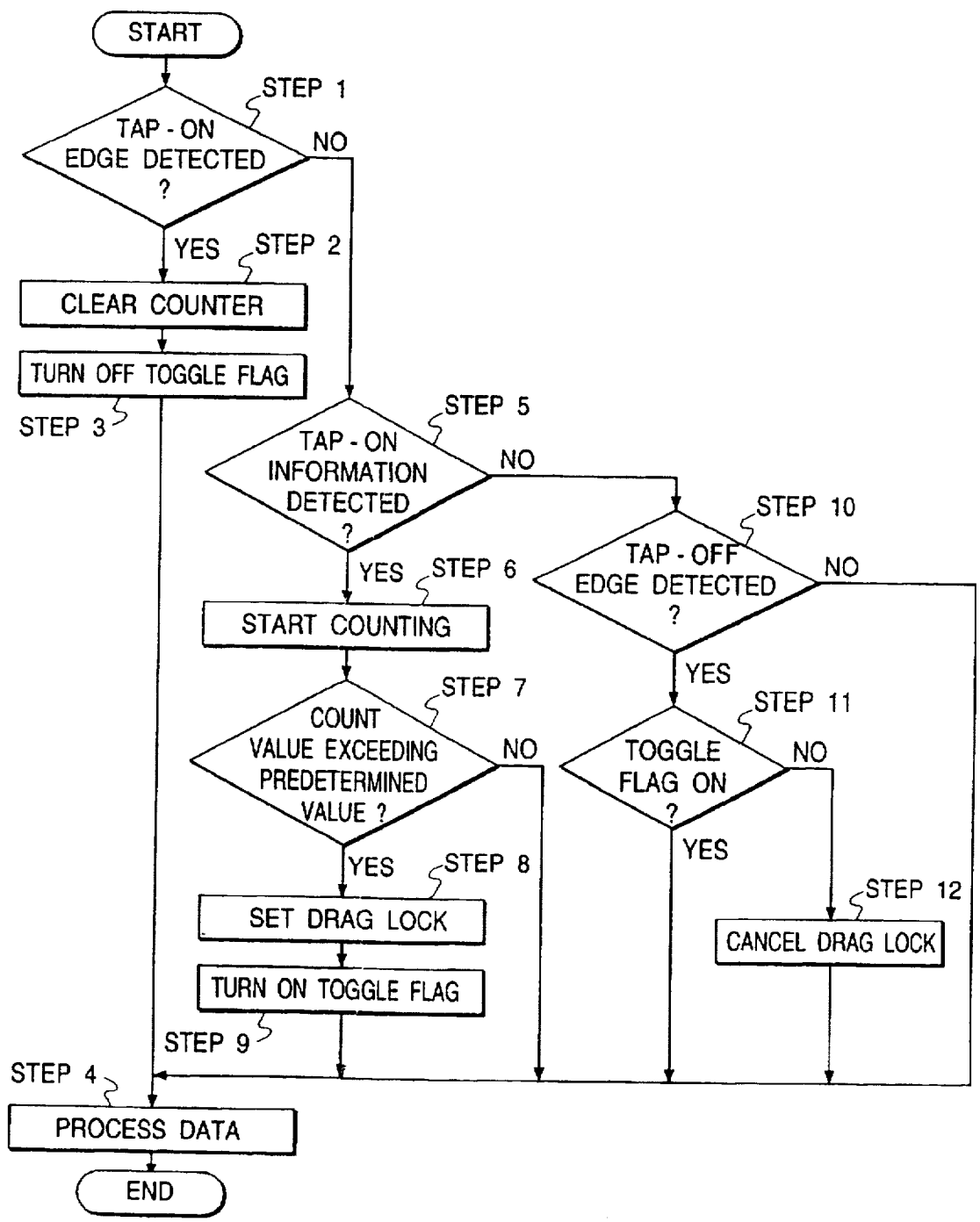
FIG. 4 is a flowchart of steps carried out by the measuring unit and control unit of the coordinate output apparatus when the latter is to be changed from one operation mode to another.

FIG. 4 is a flowchart of steps performed by the measuring unit 13 and control unit 14 of the coordinate output apparatus when the latter is to be changed from one operation mode to another. FIG. 5 is a data transition chart depicting how tap component data and slide component data illustratively change over time. How the coordinate output apparatus is changed from drag mode to drag lock mode and vice versa will now be described with reference to the flowchart of FIG. 4 and to the data transition chart of FIG. 5.

A check is made at time t1 to see if a tap-on edge is detected in the tap component data (step 1). If the tap-on edge is detected, a counter is cleared (step 2), a toggle flag is turned off (step 3), and relevant data processing is carried out in drag mode (step 4).

At time t2, a check is made to see if no tap-on edge is detected in the tap component data (step 1). If the arrival of tap-on information is detected (step 5), a counting operation is started (step 6). If the count value is not found to reach a predetermined value (step 7), relevant data processing is carried out in the same drag mode (step 4). Alternatively, the counting operation following the detection of the tap-on information may consist of measuring the period of time in which the tap-on information continues, as shown in FIG. 3B. The counting operation may also consist of measuring the distance over which the coordinate designator such as the fingertip slides on the sensor substrate 1, or of measuring the period of time in which the slide component data continues, as illustrated in FIG. 3C.

At time t3, if no tap-on edge is detected in the tap component data (step 1) and if the arrival of tap-on information is detected (step 5), then the counting operation is started (step 6). When the count value is found to reach the predetermined value (step 7), drag mode is replaced by drag lock mode (step 8), the toggle flag is turned on (step 9), and relevant data processing is performed in drag lock mode (step 4).

At time t4, if no tap-on edge is detected in the tap component data (step 1), if no tap-on information is detected (step 5), if a tap-off edge is detected (step 10) and if the toggle flag is found to be on (step 11), then relevant data processing is carried out in drag lock mode (step 4).

At time t5, if no tap-on edge is detected in the tap component data (step 1), if no tap-on information is detected (step 5) and if no tap-off edge is detected (step 10), then relevant data processing is conducted in drag lock mode.

At time t6, if no tap-on edge is detected in the tap component data (step 1), if no tap-on information is detected (step 5) and if no tap-off edge is detected (step 10), then relevant data processing is still carried out in drag lock mode.

At time t7, if a tap-on edge is detected in the tap component data (step 1), the counter is cleared (step 2), the toggle flag is turned off (step 3), and the appropriate data processing is performed in drag lock mode (step 4).

Finally at time t8, if no tap-on edge is detected in the tap component data (step 1), if no tap-on information is detected (step 5), if a tap-off edge is detected (step 10) and if the toggle flag is not found to be on (step 11), then drag lock mode is replaced by drag mode (step 12). Thereafter, relevant data processing is carried out in drag mode (step 4).

Of the steps ranging from time t1 to time t8, those between time t1 and time 4 concern the data derived from an initial operation of the coordinate designator. The steps from time 5 to time 6 apply to the data obtained from a so-called repeat operation of the coordinate designator. Because the coordinate output apparatus is switched to drag lock mode between time t5 and time t6, the steps therebetween are equivalent to a drag operation though in fact they simply make up a tracking operation.

With the above steps implemented, the "repeat" operation of the coordinate designator is made considerably easier with the inventive coordinate detection system than with conventional systems. This provides a coordinate detection system offering enhanced levels of operability.

For the above-described embodiment, it was assumed that the coordinate output apparatus is fed with tap component data and slide component data. In this connection, it will be appreciated that tap components are readily converted to switch components. That is, the tap component data may include switch component data.

As many apparently different embodiments of this invention may be made without departing from the spirit and scope thereof, it is to be understood that the invention is not limited to the specific embodiments thereof except as defined in the appended claims.

What is claimed is:

1. A coordinate input apparatus comprising a coordinate detection device and a coordinate output device, said coordinate detection device comprising:

a sensor substrate operated by a coordinate designator;

a detection signal generating unit for generating a detection signal corresponding to the operation of said coordinate designator within said sensor substrate; and a signal processing unit for digitally extracting tap component data and slide component data from inside said detection signal and for supplying the extracted data to said coordinate output device, wherein the tap component data is generated by contact between the coordinate designator and a surface of the sensor substrate, and the slide component data is generated by movement of the coordinate designator along the surface of the sensor substrate; and said coordinate output device comprising:

a data analyzing unit for analyzing the contents of said tap component data and said slide component data;

a measuring unit for measuring a time period associated with said tap component data;

a mode changing unit for changing operation modes in response to the result of the measurement by said measuring unit;

a control unit for controlling said coordinate output device as a whole; and a display unit for displaying various kinds of data;

wherein after first tap component data having a short period is detected, said mode changing unit changes an operation mode of said coordinate output device to a drag mode only when second tap component data having a relatively long time period is detected, and subsequently changes the operation mode to a drag lock mode only when the relatively long time period is greater than a predetermined time period.

2. A method for changing an operation mode of a coordinate input apparatus including a sensor substrate having a surface, the method comprising:

generating a detection signal in response to contact between a coordinate designator and the surface of the sensor substrate;

extracting tap component data and slide component data from the detection signal, the tap component data indicating contact of the coordinate designator on the surface of the sensor substrate, and the slide component data indicating movement of the coordinate designator along the surface of the sensor substrate;

measuring time periods during which the tap component data indicates continuous contact between the coordinate designator and the surface of the sensor substrate;

changing an operation mode of the coordinate input apparatus to a first state only after first tap component data having a relatively short time period is measured and, subsequently, second tap component data having a relatively long time period is measured; and changing the operation mode of the coordinate input apparatus to a second state only after relatively long time period of the second tap component data is greater than a predetermined period of time.

3. A method for changing an operation mode of a coordinate input apparatus including a sensor substrate having a surface, the method comprising:

generating a detection signal in response to contact between a coordinate designator and the surface of the sensor substrate;

extracting tap component data and slide component data from the detection signal, the tap component data indicating contact of the coordinate designator on the surface of the sensor substrate, and the slide component data indicating movement of the coordinate designator along the surface of the sensor substrate;

measuring time periods during which the tap component data indicates continuous contact between the coordinate designator and the surface of the sensor substrate;

changing an operation mode of the coordinate input apparatus to a first state only after first tap component data having a relatively short time period is measured and, subsequently, slide component data and second tap component data having a relatively long time period are simultaneously detected; and changing the operation mode of the coordinate input apparatus to a second state only if the relatively long time period of the second tap component data and the slide component data is greater than a predetermined period of time.

4. A method for changing an operation mode of a coordinate input apparatus including a sensor substrate having a surface, the method comprising:

generating a detection signal in response to contact between a coordinate designator and the surface of the sensor substrate;

extracting tap component data and slide component data from the detection signal, the tap component data indicating contact of the coordinate designator on the surface of the sensor substrate, and the slide component data indicating movement of the coordinate designator along the surface of the sensor substrate;

measuring time periods during which the tap component data, indicates continuous contact between the coordinate designator and the surface of the sensor substrate;

changing an operation mode of the coordinate input apparatus to a drag mode in response to first tap component data having a relatively short time period followed by second tap component data having a relatively long time period; and subsequently changing the operation mode of the coordinate input apparatus from the drag mode to a drag lock mode only when the relatively long time period of the second tap component data is greater than a predetermined period of time.

5. The method according to claim 4, further comprising the step of changing the operation mode from the drag lock mode to the drag mode when third tap component data having a relatively short time period is measured.

* * * * *